June 4, 1957 F. P. RODWICK 2,794,627
BLENDER
Filed Oct. 21, 1954 3 Sheets-Sheet 1
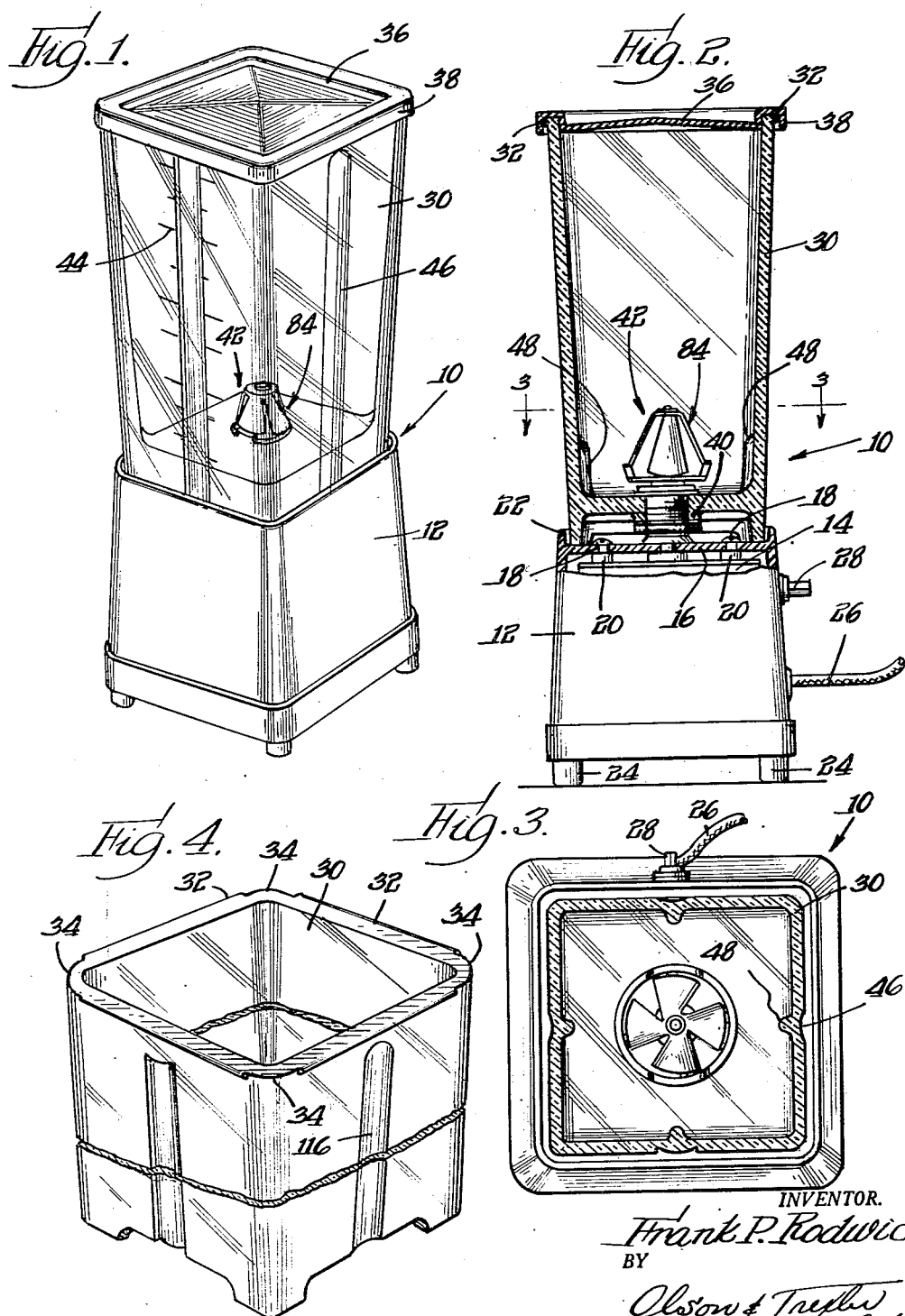
INVENTOR.
Frank P. Rodwick
BY
Olson & Trexler
Attys June 4, 1957 F. P. RODWICK 2,794,627
BLENDER
Filed Oct. 21, 1954 3 Sheets-Sheet 2
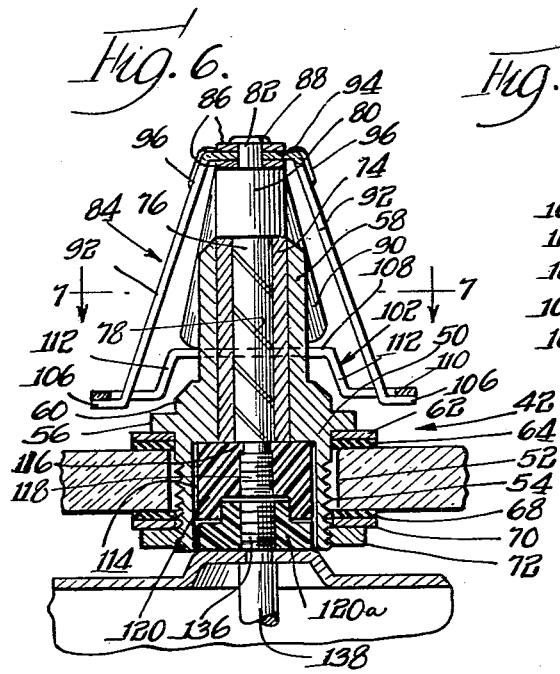
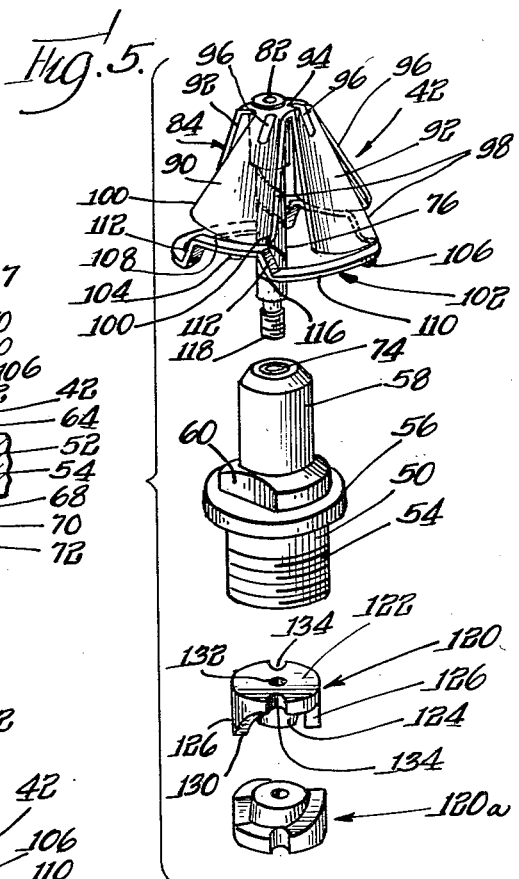
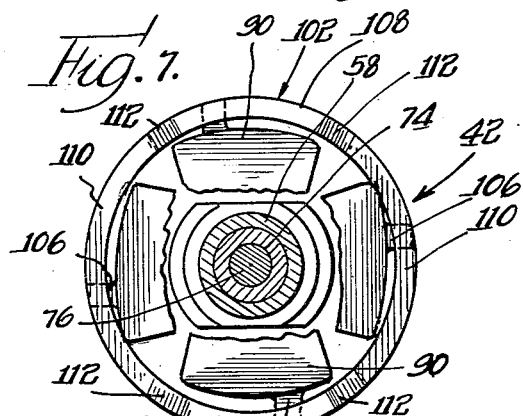
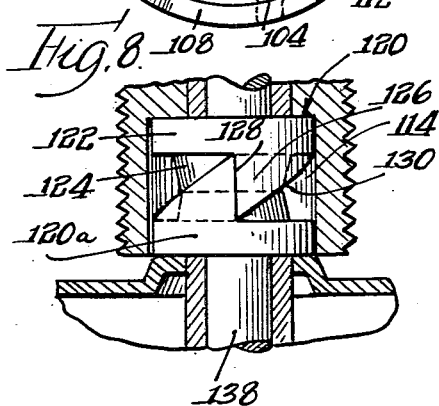
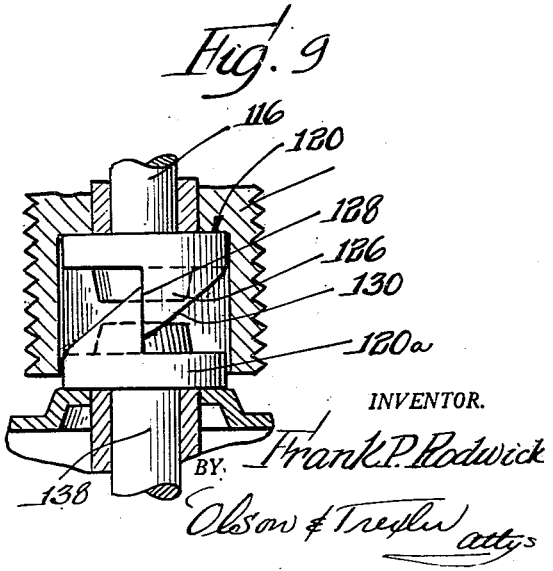
INVENTOR.
Frank P. Rodwick
BY Olson & Trexler attys

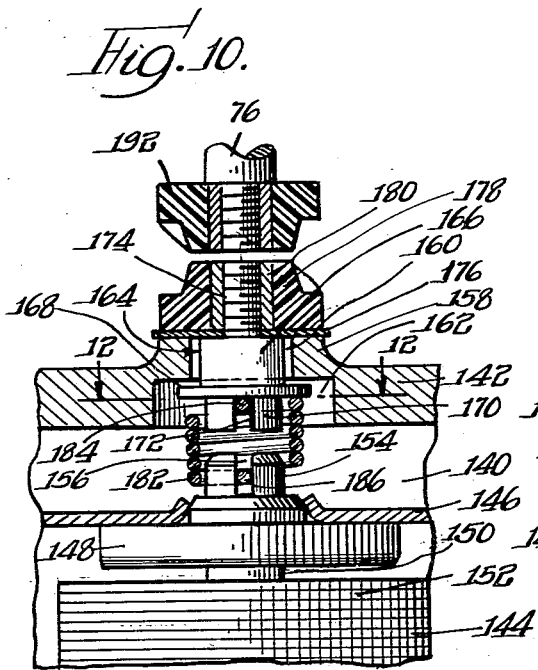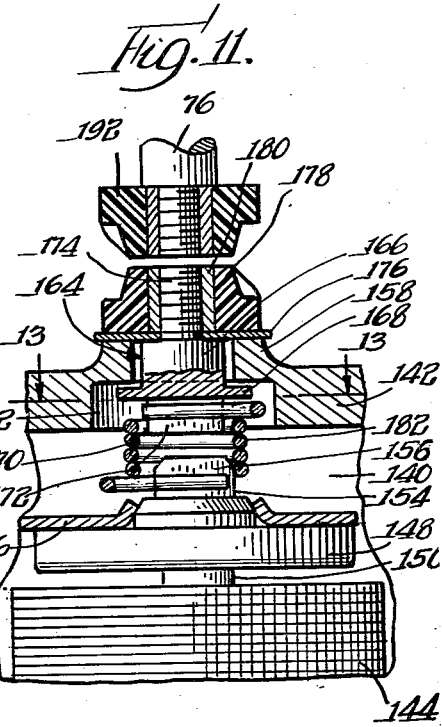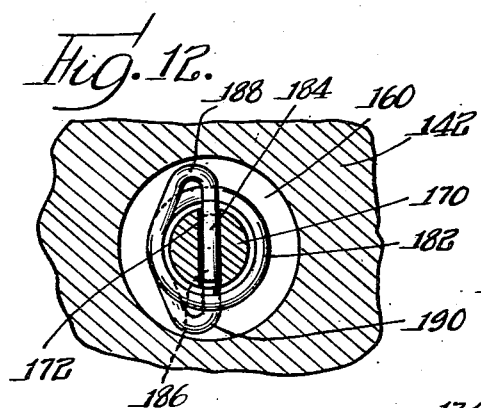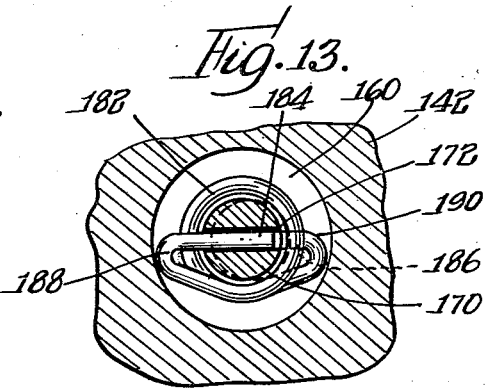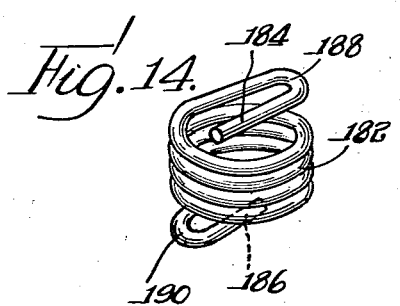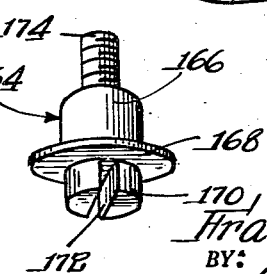

United States Patent Office

2,794,627
Patented June 4, 1957

2,794,627

BLENDER

Frank P. Rodwick, Chicago, Ill., assignor to The Silex Company, Hartford, Conn., a corporation of Connecticut Application October 21, 1954, Serial No. 463,783

6 Claims. (Cl. 259—108)

This invention is concerned generally with a food mixer, and more particularly with the type generally known as a blender or liquefier.

Blenders, as is well known, generally comprise a motorized base, and a container of glass or the like having a suitable impeller therein driven by the motor in the base to agitate liquids in the container. More specifically, frozen juices which otherwise take a long time to mix with water may be mixed extremely rapidly, and fruits or vegetables may be liquefied, either being beaten up in their own juices or having water or other liquid added thereto. It will be appreciated that the blenders likewise are effective for mixing or blending any number of other substances which are not massive, hard, or coherent. Such blenders are particularly effective for mixing ices, sherberts, or ice creams with milk or the like, and also are useful for making milk shakes, custards, and other similar mixtures.

Previous blenders or liquefiers have utilized expensive electric motors of substantial power and running at around 15,000 R. P. M. In addition to the expense of such motors, accessory parts must be held to close tolerances. Specifically, the glass or other container and the drive means between the motor and the impeller in the container must be held to close tolerances to prevent clicking and rattling during operation at high speeds and to prevent setting up strains in the glass of the container which lead to unsatisfactorily short service life of the container. In addition to the usual high costs of precision manufacture, the close tolerances heretofore required in the glass containers has resulted in a high percentage of rejects of containers due to the impossibility of holding glass containers to precise tolerances during molding.

Accordingly, it is an object of this invention to provide a blender adapted to be produced more economically.

More particularly, it is an object of this invention to provide a blender having rather wide manufacturing tolerances.

Furthermore, it is an object of this invention to provide a blender having an inexpensive electric motor, more specifically, a shaded pole induction motor.

Another object of this invention is to provide a blender having an improved clutch mechanism for driving an impeller in a removable container from a motor in the base.

In addition, it is an object of this invention to provide a clutch mechanism in a blender which aids in properly setting a removable mixing container on top of a base.

Heretofore, the high speed and high power of motors conventionally provided in blenders has been thought necessary for proper blending and liquefication. However, I have discovered that in most instances such high speed and power are unnecessary if engagement of the impeller and the ingredients to be mixed or liquefied is properly controlled.

Accordingly, it is an object of this invention to provide an improved impeller for a relatively low power, low speed blender.

Specifically, it is an object of this invention to provide a blender impeller which takes a limited bite into ingredients to be mixed or liquefied to prevent stalling of the impeller by such ingredients.

Additional objects of this invention are to provide a blender impeller of simple construction and extreme rigidity which is easily cleaned without removal from the container, but which can be removed readily for more thorough cleaning or for repair or replacement.

In order to pour liquids satisfactorily from prior containers, and yet properly to seal the containers during blending to prevent any spilling, it has been necessary heretofore to manufacture the upper portions of such containers to close tolerances. It has been mentioned heretofore in connection with the lower part of the containers that it is extremely difficult to mold glass to close tolerances, and that a high percentage of rejects consequently is encountered. This problem is intensified in the prior art blenders by the necessity of holding both the top and the bottom of the containers to close tolerances.

Therefore, it is an object of this invention to provide an improved top and cap construction in a blender container providing a proper seal during mixing and allowing ready pouring thereafter without spilling or dripping.

A further object of this invention is to provide a blender having a flexible drive connection for accommodating axial misalignment of the motor drive shaft and a drive member carried by the motor housing.

Other and further objects and advantages of the present invention will be apparent from the following description when taken in connection with the accompanying drawings wherein:

Fig. 1 is a perspective view of a blender constructed in accordance with the principles of my invention;

Fig. 2 is a side view thereof partially in vertical section;

Fig. 3 is a horizontal cross-sectional view thereof taken along the line 3—3 of Fig. 2;

Fig. 4 is a perspective view of the container with the intermediate portion thereof broken away;

Fig. 5 is an exploded perspective view of the impeller and clutch assembly;

Fig. 6 is a vertical sectional view through the impeller and clutch assembly;

Fig. 7 is a horizontal cross-sectional view taken substantially along the line 7—7 in Fig. 6;

Fig. 8 is a view of the clutch in driving engagement showing associated parts in section;

Fig. 9 is a view similar to Fig. 8 showing the clutch only partially engaged to indicate the manner in which it effects proper alignment of the clutch parts;

Fig. 10 is a vertical sectional view showing the flexible drive connection;

Fig. 11 is a view similar to Fig. 10 and taken at right angles thereto;

Fig. 12 is a cross-sectional view along the line 12—12 of Fig. 10;

Fig. 13 is a cross-sectional view along the line 13—13 of Fig. 11;

Fig. 14 is a perspective view of the flexible drive coupling; and

Fig. 15 is a perspective view of the drive spindle cooperative therewith.

Referring now to the drawings in greater particularity, and first to Figs. 1–4 for a general understanding of my invention, there will be seen a blender generally designated by the numeral 10. This blender includes a base or housing 12 of generally rectangular configuration and preferably molded of plastic, although the base or housing otherwise can be made of other materials. A motor 14 of the small shaded pole induction variety is hung from the recessed top 16 of the base by means of suitable screws 18 and spacers 20. By way of illustration, the motor may be of a size to draw approximately 90 watts.

The base 12 as is apparent in the drawings is generally rectangular in configuration, having rounded corners and flaring slightly outwardly from top to bottom. The recessed top 16 is surrounded by an upstanding flange 22, and the base is provided with a removable and perforated bottom (not shown) having substantially cylindrical rubber feet 24. The rear end of the motor shaft of the motor 14 preferably is provided with a fan for ventilating the motor. A flexible power cord 26 extends from the base 12, conveniently through the side thereof, and an on-off switch 28 is provided, conveniently on the same side of the base. The switch 28 may be of any suitable type, and in the illustrative embodiment comprises a push button switch which is pushed to turn it on, and then again is pushed to turn it off.

The blender further comprises a mixing container 30 which preferably is molded of glass. The container is of generally square outline and tapers from a minimum dimension at the bottom to a maximum dimension at the top. The top of the container is provided on its four sides with oppositely projecting lips 32 as best may be seen in Figs. 2 and 4. The lip 32 is interrupted at the corners of the container as indicated at 34, so that liquid can be poured from any corner of the container over a rather sharp edge, thus precluding spilling and dripping.

A flexible plastic cap 36 fits over the top of the container and preferably tapers very slightly so as to form a wedging fit. In any event, the fit of the cap along the lips 32 is sufficiently tight to maintain the cap securely on the container and to prevent splashing of liquid from the container. Since the fit is normally tight, the cap will fit securely even if the outside dimension is slightly undersize, and the corners of it will pull in more tightly against the corners 34 of the container to allow the flange to fit over the container lip 32 when the outside dimension is oversize.

The container is provided at the central bottom portion thereof with an apertured boss 40 receiving an impeller assembly 42. The container 30 preferably is provided with horizontal indicia 44 indicating various volume levels. The container is provided with vertical flutes 46, with reinforcing fillet ribs 48 at the lower inside corners, and also is preferably provided with transverse strengthening ribs (not shown) on the bottom.

The impeller assembly previously referred to best may be seen in Figs. 5–7. The impeller assembly comprises a bushing 50 fitting through the hole or aperture 52 in the bottom of the container and provided with threads as indicated at 54. The bushing is provided with a circumferential flange 56, and with a cylinder 58 upstanding therefrom, a nut member 60 being formed integral with the bushing at the base of the cylinder. The bushing including the flange, nut portion, and cylinder is of integral construction, and preferably is made of aluminum due to the ease of machining and the corrosion resistant qualities of this metal. A metallic washer 62, also preferably of aluminum, is positioned beneath the flange 56 and clamps a rubber or similar washer 64 against the top surface of the container bottom 66 to seal the bushing to the container. A rubber washer 68 backed by a metal washer 70, also preferably of aluminum, is clamped against the other face of the container bottom by means of a nut 72.

A bearing sleeve 74 is mounted in the cylinder 58 and conveniently may be of the porous bronze type for proper lubrication. An impeller shaft 76 is journaled in this sleeve, and is preferably provided with a helical oil groove 78. The impeller shaft 76 is provided at its upper end with an enlargement 80, and an anchoring pin 82 extends upwardly from this enlargement. An impeller 84 is mounted over this pin, having washers 86 positioned above and below the impeller, and the top end of the pin being peened over as at 88 permanently to retain the impeller thereon.

The impeller is provided with a pair of oppositely disposed short vanes or wings 90, and with a pair of oppositely disposed long wings or vanes 92 arranged generally at right angles to the short vanes. The vanes are all formed integral and are provided at their junction with the central attaching section 94 with struck out stiffening ribs 96. The vanes taper outwardly in width from top to bottom and similarly taper outwardly away from the impeller shaft 76. The leading edges of the vanes as indicated at 98 in Fig. 5 are positioned radially outwardly slightly beyond the trailing edges 100 so that when the impeller is rotated in a counterclockwise direction (looking down on top of the impeller) liquid in the container will be forced down centrally of the impeller.

The impeller 84 further is provided with a stabilizing or base ring 102 of circular outline and welded to bent over tabs 104 and 106 integral with the bottoms of the short arms 90 and long arms 92 respectively. The ring is of integral construction and comprises a pair of oppositely disposed upper segments 108 and a pair of oppositely disposed lower segments 110 respectively welded to the tabs 104 and 106, the upper and lower segments being joined by offsets 112. The trailing edge of each vane 90, 92 is somewhat shorter than the leading edge. The particular configuration of the blades or vanes and their disposition, and also the stabilizing ring serve to cause the blades or vanes to cut into the frozen juices or the like gradually, rather than to take a large bite which might stall the motor or which might cause the substances being mixed to be carried around by the blades or vanes rather than being cut thereby. The stabilizing ring also serves to brace the vanes or blades, thereby forming an extremely rigid impeller.

The bushing 50 is provided in its under side with a hollow 114 into which the reduced lower end of the spindle 78 projects. The reduced lower end provides a shoulder 116, and the end is threaded as at 118.

A clutch member 120 is threaded onto the reduced threaded end 118 of the shaft or spindle 76. The clutch member is provided with a substantially flat head 122 and with a frusto-conical body portion 124 projecting axially outwardly therefrom. A pair of teeth 126 flanks the body portion, and each tooth is provided with a straight leading or driving edge 128 and with a relieved or beveled trailing edge 130. The entire clutch member preferably is of integral construction, and preferably is made of a suitable plastic material such as nylon which is quiet in operation, of substantial strength, and has desirable self-lubricating properties. The clutch member 120 is centrally apertured as at 132, and this aperture may be prethreaded for receipt of the reduced spindle end 118, or the threads may be formed in the aperture by the threaded spindle end. Oppositely disposed notches 134 are formed in the clutch member head 122 and displaced substantially 90° from the clutch teeth 126 for receipt of a spanner wrench to facilitate installation and removal of the clutch member.

A clutch member identified by the numeral 120a, and in every respect similar to the clutch member 120 is threaded on the upwardly projecting end 136 of the motor shaft 138, this upwardly projecting end being threaded and reduced in diameter similar to the lower end of the spindle. As readily will be seen in Fig. 8, the clutch members 120 and 120a are complementary in configuration and readily mesh for driving the agitator from the motor. The tapered trailing edges of the clutch teeth of the clutch member 120a act to cam the bushing 50 to one side or the other as the clutch member 120a enters the hollow 114 of the bushing, thus serving initially to align the clutch members. Further alignment is brought about by mutual engagement of the clutch teeth with the conical bodies of the clutch members, and final alignment is effected by engagement of the teeth themselves. Thus, proper alignment of the receptacle and the base is effected without the necessity for maintenance of close tolerances in manufacturing either the base or the receptacle.

The receptacle generally can be cleaned with the agitator in place. If more thorough cleaning should be necessary from time to time, the agitator assembly readily is removed by removal of the nut 72. Complete disassembly of the agitator assembly then can be effected by unscrewing the clutch member 120. Reassembly is effected in a reverse manner.

The clutch members in their preferred form are readily fabricated, and are substantially silent in operation. Quietness of operation further is obtained by utilizing the clutch members and the hollow aluminum bushing for centering of the drive parts at the center of the container. This gives a direct centering which is much more accurate than can be achieved by effecting alignment at the periphery of the glass. Peripheral alignment often results in an elliptical orbit between drives and results in considerable chattering and noise.

Occasionally the tolerances necessary in mass production items will result in a slight tilting of the motor shaft from the vertical. When the driving clutch member 120a is mounted directly on the motor shaft as heretofore shown and described, such tilting causes misalignment of the clutch parts, thus causing an undesirable vibration which is noisy and which reduces the service life of the clutch parts. In order to compensate for such occasional misalignment I have provided a flexible drive connection as is shown in Figs. 10–15 and is described hereinafter.

A portion of the motor housing is shown at 140 in these figures, and the motor housing is provided with a top wall 142. Suitable supports are provided for hanging the motor 144 from the top wall 142 of the motor housing. A support 146 extends across the top of the motor and spaced slightly above the stator and supports a permanently lubricated bearing 148. The motor shaft 150 projects up through this bearing from the rotor 152. In the present embodiment of this invention the upper end 154 of the motor shaft is provided with a diametrical slot 156 extending axially into the end of the motor shaft.

In the top wall 142 of the motor housing is provided a raised boss 158 having a bore 160 therethrough communicating with a counterbore 162 in the under surface of the upper wall 142.

A clutch spindle 164 is mounted in the bore 116 and counterbore 162 and comprises a cylindrical body portion 166 fitting loosely in the bore 160. An integral circumferential flange 168 extends outward into the counterbore 162 to limit upward movement of the spindle, and a slotted cylindrical head 170 extends downwardly below the flange 168 and coaxial with the cylindrical body 166, being provided with a diametrical slot 172.

The spindle 164 further is provided with a reduced upper end 174. A thin washer 176 is placed over this reduced upper end and engages the top of the cylindrical body 166. A driving clutch member 178 similar to the clutch members previously disclosed but having a metallic sleeve insert 180 is threaded over the reduced upper end 174 and bears lightly against the washer 176. The flange 168 and the driving clutch member (with the washer 176) serve to trap the spindle 164 in the bore 160 and counterbore 162 free for rotation, but also free for limited axial and radial movement. A flexible driving connection is provided between the motor shaft 150 and the spindle 164 in the nature of a helically coiled spring wire 182 having the ends thereof extending diametrically across the central opening of the coil as illustrated at 184 and 186. The ends 184 and 186 are not necessarily coplanar, and they are joined to the helical coil by outwardly projecting curves 188 and 190.

The diametrical end piece 186 of the drive connection is received in the slot 156 of the motor shaft, while the end piece 184 is received in the spindle slot 176. Thus, whether or not the motor shaft and spindle are properly aligned the drive connection 182 rotates the spindle free from noise and wear, by virtue of the loose mounting of the spindle in the motor housing, by virtue of the more-or-less loose fit of the drive connection with the drive shaft and the spindle, and by virtue of the inherent flexibility of the spring steel wire of which the drive connection is made.

The driving clutch member 178 meshes with a driven clutch member 192 of similar construction and mounted on the impeller shaft 76 previously described.

The unique design of the impeller which precludes the taking of too large a bite leads to smoother action, and further tends to prevent stalling of the motor, which as heretofore has been noted is preferably of the shaded pole variety operating at relatively low speeds and with low torque compared with the more expensive universal series motors heretofore used in blenders. In actual practice, it has been found that a blender constructed in accordance with the principles of this invention can be sold at a price approximately one fourth of that of high speed, high powered blenders and yet will do at least eighty-five percent of the jobs that can be performed by said prior blenders.

The impeller forces liquid down centrally of the impeller with great velocity. As a result the liquid fans out along the bottom of the container and up along the sides to a level substantially higher than the quiescent level of the liquid, the vortex of the liquid extending down approximately to the top of the impeller. The cap prevents splashing and spilling.

It will be apparent to those skilled in the art that various changes in structure can be made, and it is desired that such changes be considered a part of this invention insofar as they fall within the spirit and scope of the appended claims.

I claim:

1. A blender comprising a base, motor means in said base, a container associated with said base, mixing means in said container, and means drivingly connecting said mixing means with said motor means for driving said mixing means, said mixing means comprising an impeller having a rotatably supported shaft, a plurality of vanes on the end of said shaft extending radially thereof and axially thereof back along said shaft, said vanes being arranged in pairs of unequal length, and a ring connected to the free ends of said vanes for bracing said vanes, said ring being provided with offset sections for attachment to said vanes.

2. An impeller for a blender comprising a shaft, a plurality of vanes mounted on said shaft and extending outwardly from and back along said shaft, said vanes tapering from a minimum width at the end of said shaft to a maximum adjacent the opposite ends of said vanes portions of said vanes in a plane perpendicular to said shaft being located at different distances from said shaft and said vanes being of at least two different lengths, and a ring secured to said vanes substantially at the outer ends thereof for bracing said vanes.

3. An impeller as set forth in claim 2 wherein the leading edges of the vanes are disposed radially outwardly of the shaft a greater distance than the trailing edges for feeding material generally axially back along said shaft.

4. An impeller for a blender comprising a shaft, a plurality of vanes mounted on said shaft and extending outwardly from and back along said shaft, portions of said vanes in a plane perpendicular to said shaft being located at different distances from said shaft, the leading edges of the vanes being disposed radially outwardly of the shaft a greater distance than the trailing edges for feeding material generally axially back along said shaft, said vanes occurring in pairs of different lengths, said vanes tapering from a minimum at their point of attachment to said shaft to a maximum at their outer ends, and a ring secured to said vanes substantially at the outer ends thereof for bracing said vanes, said ring comprising segments axially displaced from one another and integrally connected.

5. An impeller assembly for a blender or the like comprising a generally cylindrical member, means for sealing said member in a wall of a container, a shaft rotatably journaled in said cylindrical member, and a plurality of vanes on said shaft and projecting outwardly from and back along said shaft and said cylindrical member, alternate vanes being of different length.

6. An impeller assembly as set forth in claim 5 wherein the cylindrical member is provided with a flange and with a threaded end projecting from said flange for receipt of a nut sealingly to clamp on the wall of a container, and wherein the impeller is provided with a brace ring interconnecting the tips of the vanes.

References Cited in the file of this patent

UNITED STATES PATENTS

| Number | Name | Date |
|---|---|---|
| 344,611 | Applegate | June 29, 1886 |
| 1,036,159 | Sperry | Aug. 20, 1912 |
| 1,090,148 | Harr | Mar. 17, 1914 |
| 1,103,949 | Ecklyn | July 21, 1914 |
| 1,183,953 | Chilcott | May 23, 1916 |
| 1,437,246 | Horton | Nov. 28, 1922 |
| 1,735,143 | Supervielle | Nov. 12, 1929 |
| 2,013,247 | Nash | Sept. 3, 1935 |
| 2,282,866 | Hagen | May 12, 1942 |
| 2,304,476 | Poplawski | Dec. 8, 1942 |
| 2,675,040 | Raun et al. | Apr. 13, 1954 |
| 2,677,401 | Schwaneke | May 4, 1954 |